United States Patent [19]

Meckler

[11] 4,421,097

[45] Dec. 20, 1983

[54] SOLAR LIGHTING SPACE AND WATER HEATING SYSTEM

[76] Inventor: Milton Meckler, 16348 Tupper St., Sepulveda, Calif. 91348

[21] Appl. No.: 302,801

[22] Filed: Sep. 16, 1981

[51] Int. Cl.³ .............................. F24J 3/02; E06B 1/38
[52] U.S. Cl. .................................... 126/422; 126/429; 126/431; 126/447; 52/200
[58] Field of Search ............... 126/419, 450, 420, 422, 126/421, 429, 432, 428, 435, 446, 431, 447, 449; 47/17; 52/200

[56] References Cited

U.S. PATENT DOCUMENTS

| | | | |
|---|---|---|---|
| 4,050,443 | 9/1977 | Peck | 126/429 |
| 4,133,338 | 1/1979 | Honikman | 126/420 |
| 4,172,442 | 10/1979 | Boblitz | 126/422 |
| 4,191,172 | 3/1980 | Walch | 126/421 |
| 4,219,008 | 8/1980 | Schultz | 126/419 |
| 4,327,795 | 5/1982 | Wheeler | 126/429 |

FOREIGN PATENT DOCUMENTS 2460459 2/1981 France ..................... 126/450

*Primary Examiner*—Samuel Scott
*Assistant Examiner*—G. Anderson
*Attorney, Agent, or Firm*—William H. Maxwell

[57] ABSTRACT

A daylighting space and domestic water heating system comprised of primary and secondary hot water storage, a light diffusing solar absorber with a water recirculating pump and a space air recirculating blower, a mixing valve from the primary water storage and domestic supply thereof and into the secondary water storage for supplemental heating to an acceptable temperature range by means of applied energy only when required, each of the aforesaid water recirculating pump and blower and mixing valve and secondary hot water storage being independently thermostatically controlled whereby lighting and isolation for space and domestic water heating is maximized.

21 Claims, 10 Drawing Figures

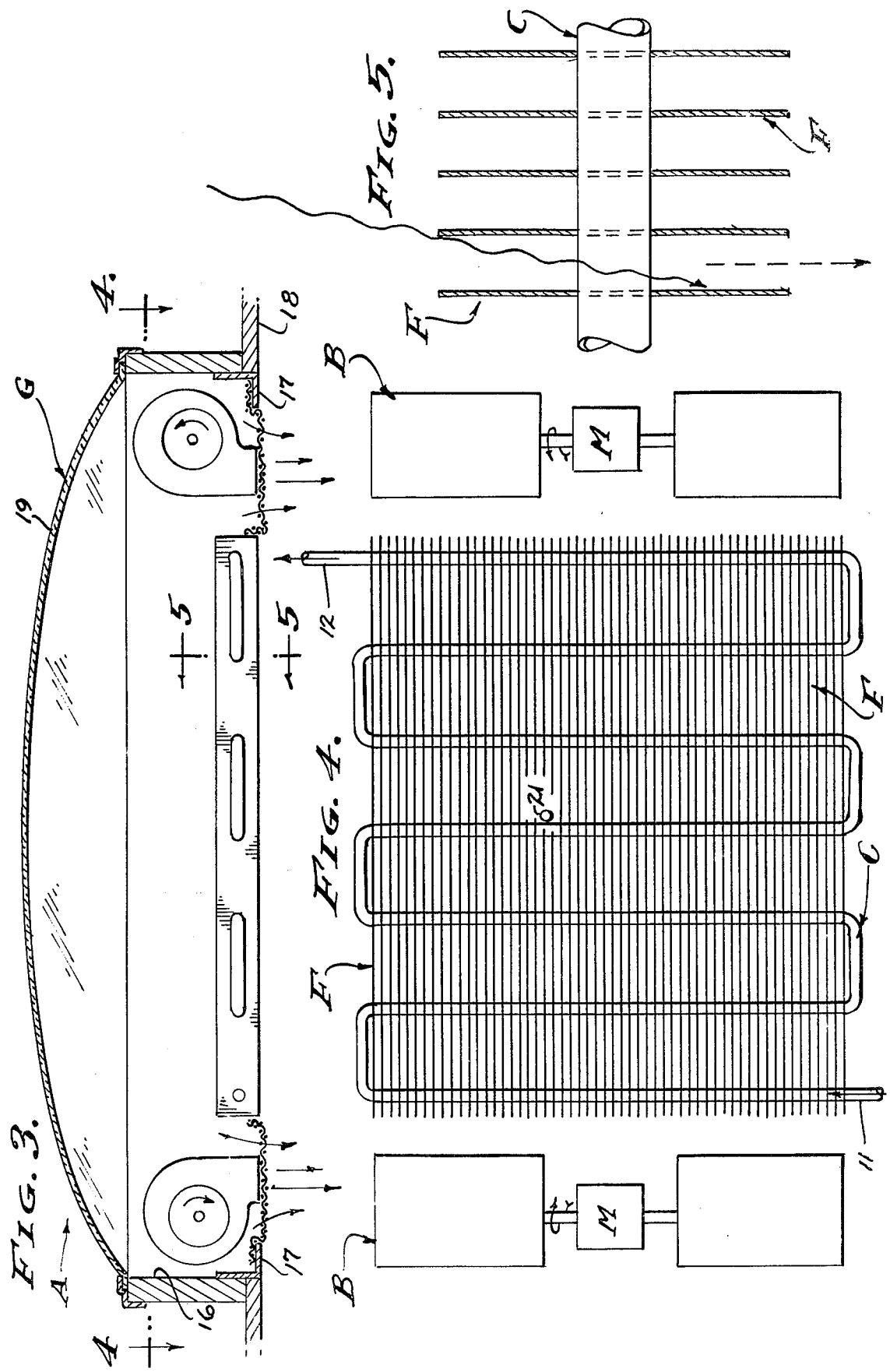

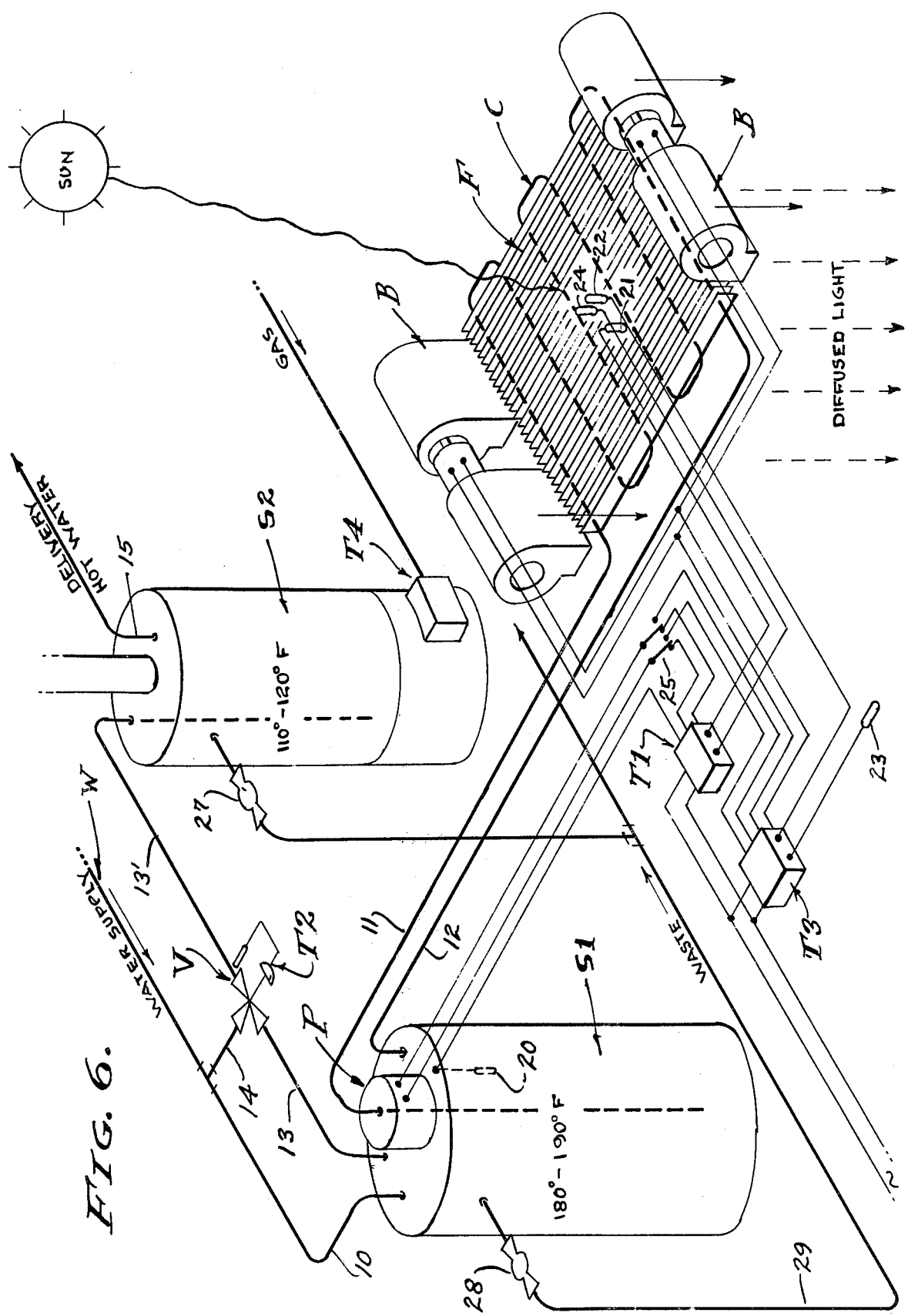

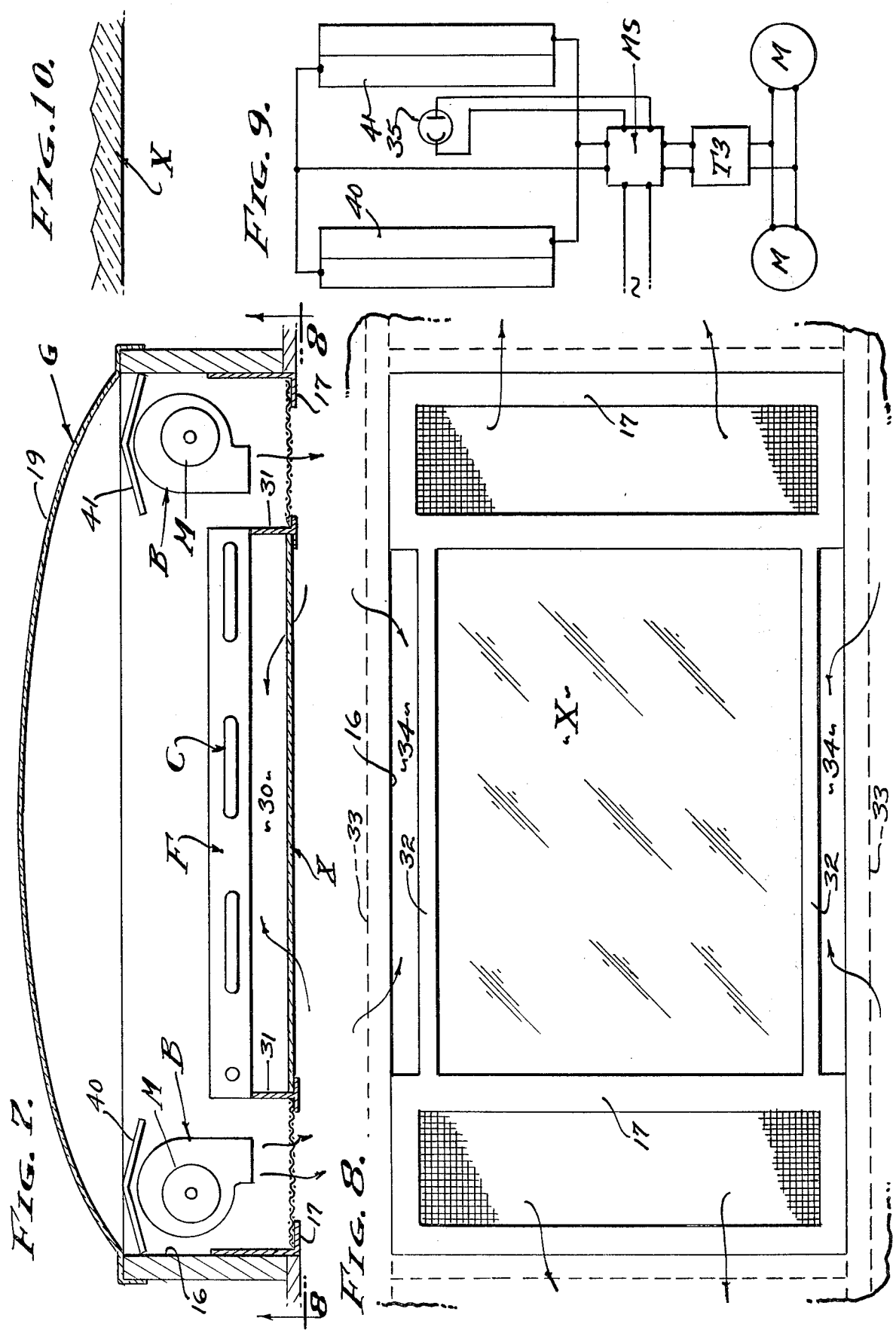

SOLAR LIGHTING SPACE AND WATER HEATING SYSTEM

BACKGROUND

Solar light and heat energy is available on a routine basis, varying according to geographic location and the seasons. Accordingly, numerous schemes have been proposed and are in use to employ insolation, and combined with other systems of heating to conserve energy. There are flat panel solar collectors, exposed coils, intensifying solar devices, and tracking means for these etc. In all instances the embodiments for collecting solar energy are rather expensive and complex. The sun's traverse dictates optimum disposition of solar heat collectors, and new construction should be designed accordingly when insolation is to be included in the construction. And, with old construction a retrofit is often problematical. Therefore, it is a general object of this invention to provide a system that can be installed in new construction and retrofitted in old construction as well.

The sun's rays not only produce useful light but heat energy as well. Accordingly, a usual building structure characteristically employs windows and skylights for the admission of the sun rays for lighting. And, the admission of visible light of course brings with it a commensurate amount of heat, sunlight being associated with warmth. However, a great deal of the sun's energy is not always utilized, collected and/or saved in the ordinary building structure. For example, an open window or skylight can let in excessive heat when it is unwanted, and without means to collect the same. It is an object of this invention to provide for solar insolation at windows or skylights, preferring the latter, to diffuse the incoming light and to collect heat energy therefrom.

Both new and old building construction, for dwellings and the like, requires the heating of water to 110°–120° F. and which is usually performed by a primary hot water heater. Solar heat collection varies dependent upon geographic location and the weather, it being usual to heat water thereby to 140°–160° F. Accordingly, it is an object of this invention to provide an insolation system that heats a liquid media that can be stored in a heated condition, namely heated water, and used as a primary source of domestic hot water in series with the aforesaid hot water heater which then becomes a secondary means of heating domestic hot water as by means of burning fuel or expending electrical power. With the present invention, the incoming water supply is routed to a primary solar storage tank from which it is recirculated through a solar absorber and from which it is drawn through a secondary gas fired or electrically powered water heater for supplemental heating when and if required.

The temperature of water available from solar heating varies greatly and is sometimes in excess of the heat demanded, while at other times it is much less than demanded. It is an object therefore to provide for the mixing of stored solar heated water with incoming cold supply water. Accordingly, a three way modulated mixing valve is provided and by means of which water at a temperature up to a regulated 110°–120° F. is delivered from the primary solar storage tank to the secondary water heater (also a storage tank). In practice therefore, the secondary water heater storage tank need be fired or energized only when the primary heated water is at a deficient temperature.

The solar absorber is unique in its finned labyrinth configuration for the combined effects of light diffusion and heat absorption. As shown, a vertically finned absorption coil is provided, and through which room or chamber air is recirculated. In this respect glazing is provided to establish a plenum overlying the solar absorber coil and light diffuser, there being blower means drawing chamber air through the solar absorber and discharging the same through nozzles aimed into the chamber for tempering the air therein.

SUMMARY OF THE INVENTION

This invention relates to the useful application of solar energy to building structures wherein daylighting and space heating is required and to supply hot water as well. It is a window or skylight solar collector which is provided in combination with a primary solar water storage means and the existent or a new water heater employed as a secondary heating and storage means supplied through the incoming domestic water supply. A feature is the closely finned solar absorber disposed in the roof plane substantially normal to the traverse of the sun's path between horizons. The fins are of a depth and space ratio to diffuse the sunlight and are vertically disposed in parallel relation to each other and to the slant or pitch of the roof; thereby establishing diffused daylighting in the room-airspace which it services. The incoming water supply is into said primary solar water storage means. A solar absorber recirculates through said primary solar storage means. The media employed in the absorption of solar heat is the domestic water which bypasses the usual water heater that now becomes a secondary heat source used only as and when required to supplement the solar heating capability dependent upon use. This is an energy conservation system that can be incorporated in new building structure or retrofitted into existent building structure. There is primary and secondary hot water storage, the primary water storage receiving the domestic supply water which is then recirculated by pump means through solar insolation means for heat absorption. A modulated mixing valve is in parallel lines from the primary storage tank and domestic water supply and responsive to deliver an admixture of water up to a maximum temperature into the secondary water storage heater. A feature is that the secondary water storage heater is a standard conventional water heater which is employed to bring the water to the required temperature when the water temperature in the primary storage tank is below said requirement. The daylighting solar collector functions as a space heater by recirculating room air through the glazed chamber and the finned coils thereof heated by recirculated media, and it functions as a solar absorber by recirculating primary storage water through the finned coils thereof. Another feature is the recirculating space heating blower, the recirculating solar heating water pump, the mixing valve, and the secondary water heater, each independently controlled by temperature responsive thermostat means.

From the foregoing and other various objects the features of this invention will be apparent and fully understood from the following detailed description of the typical preferred forms and applications thereof, throughout which description reference is made to the accompanying drawings.

DESCRIPTION OF THE DRAWINGS

FIG. 3 is a longitudinal sectional view taken as indicated by line 3—3 on FIG. 2.

FIG. 4 is a longitudinal sectional view taken as indicated by line 4—4 on FIG. 3.

FIG. 5 is an enlarged fragmentary sectional view of the solar absorber and its light labyrinth feature taken as indicated by line 5—5 on FIG. 3.

FIG. 6 is a detailed diagrammatic view of the system components as they are connected and interrelated by means of interdependent thermostatic controls.

FIG. 7 is a view similar to FIG. 3 showing a second embodiment that includes a light diffusing panel and intake plenum.

FIG. 8 is a bottom view taken as indicated by line 8—8 on FIG. 7.

FIG. 9 is an electrical schematic showing the use of solar cells as an alternate power source automatically controlled. And,

FIG. 10 is a

PREFERRED EMBODIMENT

Figure 1:
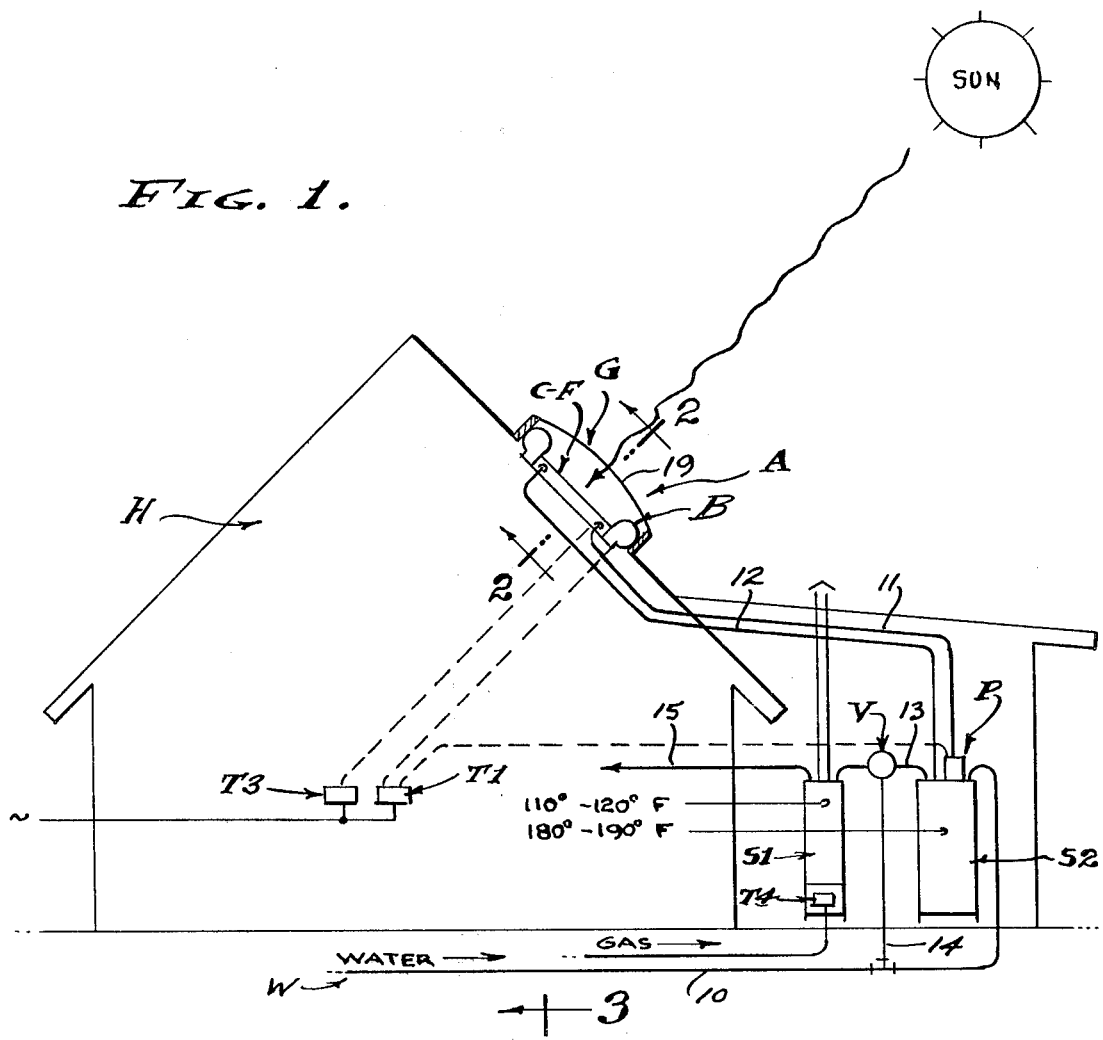
FIG. 1 is an elevation of a building with the solar system of the present invention diagrammed therein.

Referring to the drawings there is an existent or new building H having a pitched roof disposed in a sun tracking southerly direction (use in northern hemisphere), and a domestic water supply W. The building structure is conventional in every respect except of the solar absorption window or skylight A and the unique system connections through the usual hot water storage heater S2 that discharges hot water to the usual faucets, fixtures and appliances (not shown) throughout the building. It is preferred that the exterior walls, roof and/or ceilings be insulated. The location of the hot water storage heater S2 is usually situated, and in accordance with this invention there is a primary solar heated water storage tank S1 located as space permits and plumbed as will be described in combination with the said solar-skylight A and the secondary storage heater S2. Both the primary and secondary storage, tank S1 and heater S2, are heavily insulated to conserve heat. As shown, the solar-skylight A opens into a major room of the building, a room from which space air can be recirculated, and a room which can benefit from daylighting. A feature is that diffused light is admitted as the sun traverses the static installation.

Two fluid medias are cooperatively involved in this system, and both of which are moved by recirculating means, air at ambient pressure for space heating and domestic water at line pressure for the hot water supply. Accordingly, there is a blower means B for the recirculation of air through the solar-skylight A for space heating, and there is a pump means P for the recirculation of water through the solar-skylight A for water heating. The water heating at the solar-skylight A is by means of insolation and its beneficial availability and operation of pump means P is determined by differential thermostat means T1 which compares the temperature of the available solar heated water in coil C with the temperature of heated water stored in the primary tank S1. As shown, thermostat means T1 is responsive to probes 20 and 21 at the tank S1 and coil C. The water transfer to the secondary storage heater S2 is on demand as and when water is drawn from the system for domestic use, and flow thereof is through a temperature modulating mixing valve V that commingles incoming supply water W with primary storage water S1 as and when required to maintain the secondary storage temperature at or below 110°-120° F., as determined by a thermostat controlled flow balancing aquastat T2 at said valve V. Space heating is by means of absorption into and dissipation from a finned labyrinth coil C and operation of blower means B therefor as determined by a selective temperature level thermostat T3 which senses room or space temperature. Thermostat means T1 can be preempted by antifreeze means 24 which is made operational to motivate the pump P in the event that freezing conditions at the solar-skylight A would endanger the finned coil C.

The water supply W is plumbed directly by supply line 10 into the primary storage tank S1 which can be installed in the building H along with the secondary water storage heater S2. For example, such an installation can be made in a basement, a garage, or any suitable service room; and in some instances out of doors. Typically, the fluid connections for water storage tanks S1 and S2 of the type under consideration are through the top end closures thereof, as shown; the primary tank S1 being plumbed to recirculation lines 11 and 12 extending through the solar absorption coil C, and to the secondary tank S2 by a transfer line 13. In accordance with this invention there is a single valve means in the form of the tempering valve V and more specifically a temperature modulated mixing valve that is responsive to the flow balancing aquastat T2. As shown, there is a bypass line 14 from supply line 10 and which runs parallel with transfer line 13, lines 13 and 14 opening through valve V and line 13' into the secondary storage heater S2. The top of the secondary water heater S2 is then plumbed into the plumbing of the building H through a delivery line 15.

The secondary water storage heater S2 is that type of domestic heater commonly employed and equipped with a gas burner or the like which is automatically controlled by a thermostat means T4 to maintain a supply of water within a predetermined temperature range, for example a range of 110°-120° F. suitable for domestic use. It is to be understood that this temperature range can vary and that the heater S2 can be fired by other fuels or electrically powered.

The water temperature in storage tank S1 varies widely while the water temperature in storage tank S2 is maintained at about the aforesaid domestic range. For example, the incoming water supply W can be near freezing at times, although the normal supply temperature can be expected to be in the 50°-60° F. range. Likewise, the recirculated water through coil C can be near or subject to freezing, although the normal low temperature can be expected to be near the ambient space or room temperature serviced by the solar-skylight A. However, the coil C in combination with the solar-skylight A can also be expected to raise the temperature of the recirculated water through lines 11 and 12 and in storage tank S1 into the high heat range of 180°-190° F., higher heat than permissible in the water storage heater S2. Accordingly, the tempering modulated mixing valve V is provided to admix low temperature supply water from bypass line 14 with higher temperature storage (S1) water from transfer line 13, when the temperature of water delivered through line 14 exceeds the 110°-120° F. permissible range. It is the flow balancing aquastat T2 which senses discharge temperature differential and admixes the colder water in proportion to the heat differential in order to hold delivery water through line 13' at or below said permissible range. When primary storage water S1 through line 13 is below said permissible range, it is delivered exclusively, without the admixture of colder water from bypass line 14 that remains closed in response to aquastat T2. Thus, tempered water at or below the permissible heat range of 110°-120° F. is delivered on domestic use demand through line 13' and into the secondary storage heater S2.

In accordance with this invention, I have provided the solar-skylight A which involves, an opening 15 in the building roof and exposed to the traverse of the sun, the insolation solar absorber coil C, glazing G, and the blower means B. This solar-skylight A is capable of a number of functions which include daylighting, heat absorption for storage, and space heating. These three general functions are carried out independently and are advantageously employed as circumstances require. The daylighting involves the admission of diffused light through a labyrinth of fins which characterize the solar absorber coil C. The heat absorption involves high absorptive capability of the finned coil C and its low emissivity, with the pump means P in lines 11 and 12 to storage tank S1. And, the space heating involves the hot-house effect of the glazing G, with the blower means B that recirculates space or room air through said finned coil and glazed chamber of the skylight, for discharge into said space or room. This solar skylight A is a static installation as it is shown herein.

The opening 16 is between the beams or rafters of a typical roof structure of substantial depth, a rectangular opening several feet wide, proportioned as shown. The solar absorber coil C is disposed in a frame 17 secured in said opening and is comprised of a continuous length of tubing recurvedly bent to extend from side to side of the frame 17 in a plane at or parallel to the ceiling 18. As shown, the ceiling follows the pitch of the roof. The opposite ends of the coil C are coupled to the flow lines 11 and 12 in which the pump means P operates, an electrically driven pump unit as indicated. A feature of the solar absorber coil C is its incorporation in a finned labyrinth that is substantially coextensive of the area of opening 16. The solar absorber coil C is characterized by closely related fins F vertically disposed and parallel one with the other. The fins F are vertically disposed as they extend parallel with the rise of the roof, and they are closely related with respect to their depth, so as to exclude penetration of direct sunlight under most all conditions. For example, the ratio of spacing to depth can be 1:5 to 1:10; and all of which varies with the light penetration desired. Only when the sun is at zenith, or thereabout, will light directly penetrate this finned labyrinth; and if desired a coextensive shade or filter (not shown) can be employed if light is to be obscured or reduced.

This solar-skylight A has the threefold functions as hereinabove described, and features the glazing G that establishes a chamber or plenum overlying the finned solar absorber coil C. In practice, the plenum is coextensive of the opening 16 and its depth nominally equal to the depth of the structural roof rafter, for example 6 or 8 inches. As shown herein the plenum is a box structure raised above the roof. The glazing G is a transparent panel or dome 19 of clear acrylic plastic, or the like, so that the available sun's rays heat the air in said plenum and impinge upon the solar absorber fins and coil C for heat absorption into the water recirculated by pump means P. The fins F are thin metallic plates of aluminum or the like finished in dull black for high heat absorption and low emissivity properties, so that insolation is efficient. The glazing G and the imperforate side walls of the plenum closed thereby provide the hot-house function and effect for the direct heating of air openly ventilated through the finned coil C. Thus, air in the plenum is heated during the insolation effect whereby water media is simultaneously heated in coil C.

In accordance with this invention, the solar-skylight A features a blower means B that draws heated air through the finned coils C and out of the (hot-house) plenum and returns the same into the room-air space to be heated. The blower means B is located at or alongside the coil C and features one or more fans that nozzle discharge air downwardly into the room-air space. In practice, there is a centrifugal blower at each end of the plenum, with a scroll drawing from the plenum and with a peripheral discharge nozzle directed downward to direct a sheet of air into the room-air space. The air delivery of blower means B is confined to relatively small marginal areas of the opening 16, leaving the relatively large finned coil area open for recirculation of air upwardly into and through the plenum. Thermostat T3 senses the difference between room-air space temperature and plenum temperature, and closes a power circuit to blower means B below a desired preset room-air space temperature sensed by a probe 23 when said plenum air temperature sensed by probe 22 is above a predetermined minimum.

Figure 2:
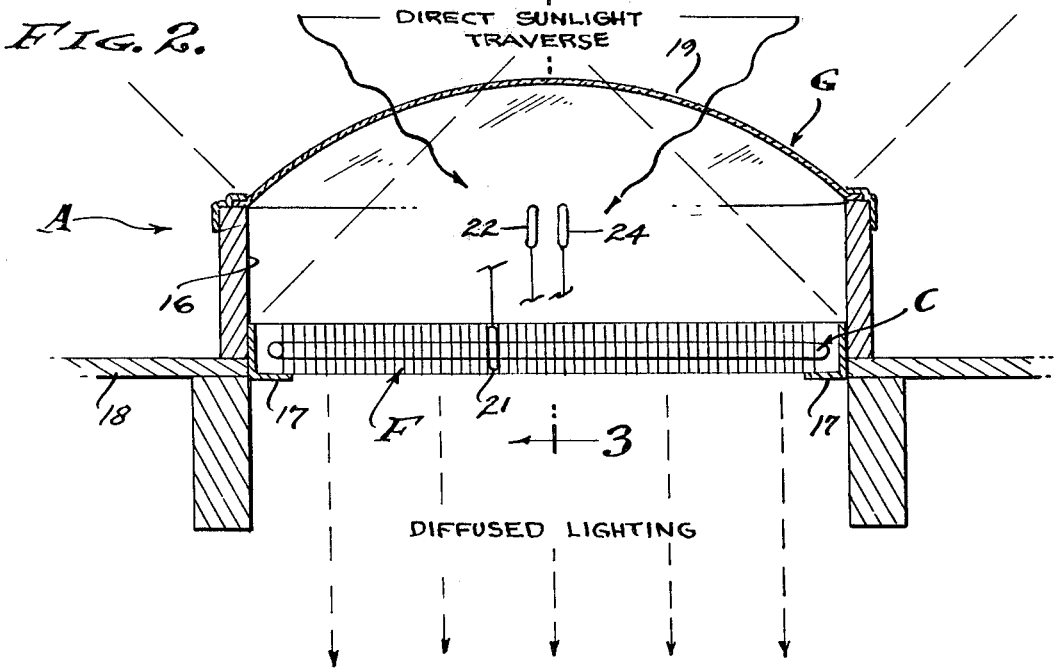
FIG. 2 is an enlarged sectional view of the window or skylight with the light diffusing coil therein and taken as indicated by line 2—2 on FIG. 1.

Referring now to the second embodiment as shown in FIGS. 7-9 of the drawings, the hot-house effect of the glazed chamber is increased while simultaneously heating water and space. A feature of the present invention is the lowered temperature of the finned absorber coil C by recirculating room air over the fins F so that said fins are more efficient in their insolation capacity for water heating. Also, the fins F as hereinabove described tend to columnated incoming light so that diffusion is not as complete as may be desired. Accordingly, I provide light diffusing panel X spaced below the finned absorber coil C, as it is installed in FIG. 2 and as it is shown in FIGS. 7 and 8, whereby heat is captured within said chamber while recirculated air is directed to flow through the fins F so as to reduce their temperature and to fill the said chamber for discharge by the blower means B. The light diffusing panel X is translucent or transparent, such as a transparent prismatic sheet diffuser, and preferably the latter comprised of a multiplicity of adjacently related prismatic lens facets coextensive of said diffuser sheet. Columnated light is thereby diffused (see FIG. 10 of the drawings).

The diffusing panel X is spaced below the absorber fins F and coil C and coextensively underlies said fins and coil to form an intake plenum 30 beneath the absorber. Accordingly, the plenum 30 is isolated from the blower delivery areas of the opening 16 by means of partitions 31, so that the fans of blower means B nozzle discharge air downwardly into the room-air space without commingling with the recirculated air entering the glazed chamber through the plenum 30. Recirculation of room-air into plenum 30 is from the side margins of the diffusing panel X and coextensively therealong, whereby air flow is by convection into the chamber through the fins F. In practice, the diffusing panel X is supported upon T-rails 32 spaced from side members 33 so as to form opposite side intake slots 34, whereby room-air flows into the plenum 30 beneath the fins F and by convection to flow upwardly into the glazed chamber. The air delivery blower means B then withdraws the heated air for nozzle discharge into the room-air space.

Referring to FIG. 9 of the drawings, the blower means B is solar powered by photo voltaic panels 40 and 41 overlying and acting as shields over said blower means. This alternate source of power is switched "ON" in lieu of the A.C. power source hereinabove described, responsive to a photoelectric modulator switch means MS. Accordingly, a photoelectric cell 35 is responsive to sunlight to switch on the means MS when insolation is commensurate with the air recirculation requirements of the blower means B. However, when solar power means is inadequate, the means MS switches to the A.C. power source. The two power sources are controlled through the thermostat T3 which operates the blower means B as described. A feature is the modulation of power according to the heat radiating capabilities of the finned coil C, by modulator switch means MS which operates to control the speed of the motors M of blower means B, at a rate of speed limited by the heat available from the fins F and coil C.

In the heat storage mode, water temperature in tank S1 is maximized through the insolation of solar heat into the finned coil C usefully employed when the absorber temperature is greater than the water temperature in storage tank S1. Thermostat T1 inherently senses the difference between S1 water temperature and absorber coil C water temperature and closes a power circuit to pump means P when said coil temperature is greater than said S1 water temperature, thereby increasing storage S1 water temperature when solar insolation is available.

In the domestic water heating mode the operation of thermostat T1 and pump means P is entirely automatic for the storage of fluid media heated by the solar absorption coil C, in excess of the temperature of water stored in primary tank S1. And, the aquastat controlled valve V automatically limits the delivery temperature of of water to the secondary storage tank S2.

In the space heating mode water temperature in storage tank S1 above room-air space temperature is available for space heating through the emission of stored heat from the finned coil C usefully employed when the stored water temperature up to 180°-190° F. in tank S1 is greater than the room temperature up to 70° F. Accordingly, a double throw selector switch 25 with an "off" position preempts thermostat T1 control over pump means P and puts said pump means in circuit with the room-air space temperature responsive means of thermostat T3, so that the power circuit to pump means P is closed at or below the said desired preset room-air space temperature. The finned coil C is thereby brought up to heat and the plenum air temperature raised so that the above described thermostat T3 operates blower means b in the usual manner for space heating.

Thermostat T1 is also preempted by the antifreeze means probe 24 when the water temperature in coil C closely approaches the freezing level. This is an independent safety feature that precludes freezing in severe climatic environments, by virtue of the fluidity of the available domestic water above freezing temperature. The probe 24 at coil C operates thermostat T1 in the freezing range, for example below 35° F., to close the power circuit to pump means P for recirculation of water from storage tank S1 through the coil C.

Another safety feature is the temperature and pressure relief valves 27 and 28, provided to discharge into waste line 29 in the event that excess (steam) pressure developes in the system and backs up into either tank S1 or S2. These valves are independent and self operating.

From the foregoing it will be seen, that the three domestic functions of this solar lighting space and water heater system are automated with independent controls, that space heating and primary water storage are independently controlled by thermostats, that solar heated water is independently tempered with incoming domestic supply water by an aquastat, and that the domestic hot water discharge is through a conventional thermostat controlled hot water storage heater used exclusively herein as a secondary water storage for maximized conservation of energy. It is significant that the aforesaid independently operable means are interdependent in a combination as they are responsive to interrelated temperature differentials as determined by normal temperature range requirements of room-air space heating and domestic hot water heating, and all of which is associated with daylighting requirements wherein a solar skylight diffuses incoming sun rays and simultaneously absorbs solar heat therefrom for storage and concurrant and/or subsequent use. Direct sunlight is effectively blocked by the labyrinth feature which enhances the solar absorber coil C for high absorption and low emissivity.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A solar lighting and insolation system for room-chamber daylighting and space heating, and including;
    a window-skylight opening exposed to the traverse plane of the sun between horizons and through a transparent cover forming the outer wall of a plenum chamber to contain heated air,
    a solar absorber occupying said opening and comprised of a heat transfer coil for transporting fluid media and having closely related fins forming the inner wall of said plenum chamber and vertically and fixedly disposed in spaced parallel planes angularly related to said traverse plane for high absorbtivity and low emissivity and forming a labyrinth for diffused daylighting within said room-chamber,
    means transporting the fluid media through the coil for heat transfer at the finned labyrinth,
    a recirculating means transporting the heated air through said plenum and finned absorber coil and through said room-chamber,
    and a temperature responsive means operating the recirculating means when insolate heated air is available through the said plenum and finned absorber coil at a higher temperature than the air in the room-chamber.

2. The solar lighting and insolation system for room-chamber daylighting and space heating as set forth in claim 1, wherein the temperature responsive means is a differential thermostat control means with a probe in the window-skylight plenum and a probe in the room-chamber.

3. The solar lighting and insolation system for room-chamber daylighting and space heating as set forth in claim 1, wherein the window-skylight opening is in a roof structure disposed substantially normal to the traverse plane of the sun between horizons.

4. The solar lighting and insolation system for room-chamber daylighting and space heating as set forth in claim 1, wherein the fins are as closely related to obscure direct sunlight into the room-chamber except at the zenith position of the sun.

5. The solar lighting and insolation system for room-chamber daylighting and space heating as set forth in claim 1, wherein the window-skylight opening is in a roof structure disposed substantially normal to the traverse plane of the sun between horizons, and wherein the fins are as closely related to obscure direct sunlight into the room-chamber except at the zenith position of the sun.

6. The solar lighting and insolation system for room-chamber daylighting and space heating as set forth in any one of claims 4 or 5, wherein the dimensional ratio of vertical height as related to the spacing of the fins is in the range of 1:5 to 1:10.

7. The solar lighting and insolation system for room-chamber daylighting and space heating as set forth in any one of claims 3 through 5 inclusive, wherein the recirculating means is an air blower means with its induction within the plenum and with a discharge nozzle directed along at least one side edge of the window-skylight opening.

8. A solar lighting and insolation system for room-chamber daylighting and space and water heating, and including;
   a window-skylight opening exposed to the traverse plane of the sun between horizons and through a transparent cover forming the outer wall of a plenum chamber to contain heated air,
   a solar absorber occupying said opening and comprised of heat transfer coil for transporting water and having closely related fins forming the inner wall of said plenum chamber and vertically and fixedly disposed in spaced parallel planes angularly related to said traverse plane for high absorbtivity and low emissivity and forming a labyrinth within said room-chamber,
   a first recirculating means transporting the water through the heat transfer coil and a water storage tank supplied directly from a pressured water supply,
   a temperature responsive means operating the first recirculating means when solar heated water is available through the solar absorber at a higher temperature than the water in the primary storage tank,
   a second recirculating means transporting the heated air through said plenum and finned absorber coil and through said room-chamber,
   and a temperature responsive means operating the second recirculating means when insolated heated air is available through the said plenum and finned absorber coil at a higher temperature than the air in the room-chamber.

9. The solar lighting and insolation system for room-chamber daylighting and space and water heating as set forth in claim 8, wherein the temperature responsive means operating the first recirculating means is a differential thermostat control means with a probe at the primary water storage tank and at the solar absorber coil, and wherein the temperature responsive means operating the second recirculating means is a differential thermostat control means with a probe in the windowskylight plenum and a probe in the room-chamber.

10. The solar lighting and insolation system for room-chamber daylighting and space and water heating as set forth in claim 8, wherein the temperature responsive means operating the first recirculation means is a differential thermostat for the heat storage mode and with control means with a probe at the primary water storage tank and at the solar absorber coil, and wherein a heating mode switch is selectively positioned to disconnect the first mentioned thermostat control from the first recirculating means and reconnect said first recirculating means with the second mentioned thermostat control responsive to room-chamber temperature and including a differential control means with a probe in the window-skylight plenum to operate the second recirculating means.

11. The solar lighting and insolation system for room-chamber daylighting and space and water heating as set forth in claim 8, wherein the temperature responsive means is a differential thermostat control means with a probe in the window-skylight plenum and a probe in the room-chamber.

12. The solar lighting and insolation system for room-chamber daylighting and space and water heating as set forth in claim 8, wherein the window-skylight opening is in a roof structure disposed substantially normal to the traverse plane of the sun between horizons.

13. The solar lighting and insolation system for room-chamber daylighting and space and water heating as set forth in claim 8, wherein the fins are vertically disposed in spaced parallel planes closely to obscure direct sunlight into the room-chamber except at the zenith position of the sun.

14. The solar lighting and insolation system for room-chamber daylighting and space and water heating as set forth in claim 8, wherein the temperature responsive means operating the first recirculating means is a differential thermostat control means with a probe at the primary water storage tank and at the solar absorber coil, wherein the temperature responsive means operating the second recirculating means is a differential thermostat control means with a probe in the windowskylight plenum and a probe in the room-chamber, and wherein a mixing valve controlled by temperature responsive means is disposed in the delivery line between the primary water storage tank and the secondary hot water storage tank and between the said pressured water supply and the secondary hot water storage tank, and operative to restrict the delivery line water temperature into said secondary hot water storage tank to said predetermined temperature rangeof useful water.

15. The solar lighting and insolation system for room-chamber daylighting and space heating as set forth in any one of claims 1 or 8, wherein a transparent panel underlies the solar absorber in spaced relation thereto enclosing the first mentioned plenum chamber and forming an intake plenum beneath the solar absorber for the induction of air through the fins thereof, the intake plenum being isolated from the recirculating means transporting heated air and in open communication to said room-chamber.

16. The solar lighting and insolation system for room-chamber daylighting and space heating as set forth in any one of claims 1 or 8, wherein a light diffusing panel underlies the solar absorber in spaced relation thereto enclosing the first mentioned plenum chamber and forming an intake plenum beneath the solar absorber for the induction of air through the fins thereof, the intake plenum being isolated from the recirculating means transporting heated air and in open communication to said room-chamber.

17. The solar lighting and insolation system for room-chamber daylighting and space heating as set forth in any one of claims 1 or 8, wherein a light diffusing panel comprised of a multiplicity of adjacently related prismatic lens facets underlies the solar absorber in spaced relation thereto enclosing the first mentioned plenum chamber and forming an intake plenum beneath the solar absorber for the induction of air through the fins thereof, the intake plenum being isolated from the recirculating means transporting heated air and in open communication to said room-chamber.

18. The solar lighting and insolation system for room-chamber daylighting and space heating as set forth in any one of claims 1 or 8, wherein a transparent panel underlies the solar absorber in spaced relation thereto enclosing the first mentioned plenum chamber and forming an intake plenum beneath the solar absorber for the induction of air through the fins thereof, the intake plenum being isolated from the recirculating means transporting heated air by a partition disposed at an edge thereof and in open communication with said room-chamber at another edge thereof.

19. The solar lighting and insolation system for room-chamber daylighting and space heating as set forth in any one of claims 1 or 8, wherein a transparent panel underlies the solar absorber in spaced relation thereto enclosing the first mentioned plenum chamber and forming an intake plenum beneath the solar absorber for the induction of air through the fins thereof, the intake plenum being isolated from the recirculating means transporting heated air by a partition disposed coextensively along at least one edge thereof and in open communication with said room-chamber coextensively along at least one other edge thereof.

20. The solar lighting and insolation system for room-chamber daylighting and space heating as set forth in any one of claims 1 or 8, wherein the recirculation means transporting heated air is alternately powered from an alternating current power source and a solar power source through a switch means responsive to sunlight controlling the recirculation means to operate under solar power when it is available.

21. The solar lighting and insolation system for room-chamber daylighting and space heating as set forth in any one of claims 1 or 8, wherein the recirculation means transporting heated air is alternately powered from an alternating current power source and a solar power source through a modulator switch means responsive to sunlight controlling the recirculation means to operate at a speed commensurate with the heat radiating capacity of the finned solar absorber and under solar power with it is available.

* * * * *